United States Patent [19]

Grant et al.

[11] Patent Number: 4,723,977

[45] Date of Patent: Feb. 9, 1988

[54] ELECTRONIC SERVO CONTROL OF GLASS GOB DISTRIBUTION

[75] Inventors: Marty J. Grant, Newington; George T. Peterson, Bristol; Robert P. Andersen, Monroe, all of Conn.

[73] Assignee: Emhart Industries, Inc., Farmington, Conn.

[21] Appl. No.: 932,757

[22] Filed: Nov. 19, 1986

[51] Int. Cl.$^4$ .................................................. C03B 7/16
[52] U.S. Cl. ........................................ 65/29; 65/160; 65/163; 65/DIG. 13
[58] Field of Search ................. 65/DIG. 13, 160, 163, 65/29

[56] References Cited

U.S. PATENT DOCUMENTS

| | | | |
|---|---|---|---|
| 4,461,637 | 7/1984 | Jones et al. | 65/158 |
| 4,529,429 | 7/1985 | Wood | 65/29 |
| 4,548,637 | 10/1986 | Miller | 65/163 |
| 4,599,101 | 7/1986 | Douglas et al. | 65/163 X |
| 4,608,074 | 8/1986 | Knoth et al. | 65/163 X |

OTHER PUBLICATIONS

Paper allegedly given at symposium in 1980 by Heye Glass, "Design Function and Control of the H 1-2 Machine"; See especially pp. 104-107, FIGS. 10,11.

Primary Examiner—Arthur Kellogg
Attorney, Agent, or Firm—Arthur B. Moore

[57] ABSTRACT

Method and apparatus for electronically controlling a servo motor drive for glass gob distribution apparatus, to provide accurate high speed motion of one or more scoops. At the set-up stage, the operator adjusts the scoop position with respect to each trough to align scoop and trough in a straight line. During automatic operation, upon receipt of a MOVE command a motion control computer provides digital output signals to move the scoops through a prescribed motion profile, such profile having suitable characteristics to move the scoops over various distances without vibration or overshoot. A digitalized cubic-parabolic-cubic (CPC) curve or similar cam profile is scaled to the amplitude and direction of the required motion, and the motion profile computer outputs command signals on a point-by-point basis over the time span of this stored motion profile. Such time span is designed to provide sufficient dwell time to allow the gobs to traverse the scoops. This motion sequence is reiterated for each successive receiving trough according to the prescribed firing order, using the prior target location to define the starting location of the succeeding scaled motion profile.

18 Claims, 15 Drawing Figures

ELECTRONIC SERVO CONTROL OF GLASS GOB DISTRIBUTION

BACKGROUND OF THE INVENTION

The present invention relates to an electronic control system for glass gob distribution apparatus, and in particular to a system for controlling an electronic servo motor which in turn acts as the actuator for the glass gob distribution apparatus. Such apparatus is intended for use in glassware production machines comprising a plurality of individually controllable sections. Each section includes a molding assembly of single or multiple cavity design, and all of the various machine sections of the single machine are to be sequentially supplied with molten glass gobs. The gob distributor includes a set of arcuate scoops which receive a glass gob from the feeder assembly and which must be moved in proper sequence to direct the gobs of molten glass to the appropriate machine sections. Chutes are generally provided to direct the glass gobs to the several machine sections. In gob distribution apparatus for a multiple-gob forming machine, the apparatus includes a group of scoops matching in number the number of mold assemblies per section, and further includes a drive assembly for manipulating the scoop group so as to sequentially distribute the groups of glass gobs into a plurality of fixed chutes associated with preselected machine sections.

Various types of drives have been designed for gob distribution apparatus of the type described above. In the system of U.S. Pat. No. Re. 28,759, commonly owned with the present patent application, a scoop group has associated annular spur gears which are driven in unison via reciprocating rack gear through a predetermined schedule of angular displacements. A cam follower connected to the rack gear causes programmed movement thereof in response to rotation of a cam having lobes of suitable height to produce such predetermined schedule of angular displacements. Another approach, exemplified by U.S. Pat. No. 3,775,083, also commonly owned with the present application, uses air-driven actuators to produce programmed movement of rack gears in a system such as that of U.S. Pat. No. Re. 28,759. By properly setting up the exhaust ports in a plurality of pistons in such pneumatic actuators, the user establishes a predetermined schedule of angular displacement of the scoops.

In recent years, the patent art has included a number of gob distribution systems making use of an electrically actuated motor as a drive source for the gob distribution apparatus. One such system is disclosed in commonly owned U S. Pat. No. 4,599,101, the disclosure of which is incorporated herein by reference. This system uses a servomotor, advantageously a reversible DC motor, which is linked to a rack by a rotary-to-linear drive. The rack in turn mates with annular spur gears associated with the scoops in the manner of U.S. Pat. No. Re. 28,759, discussed above. This drive arrangement enjoys a number of advantages, including reduced backlash and the ability to more accurately place the scoop in a short period of time. To take proper advantage of the capabilities of this system, there is a need for an electronic drive system for the servo motor which will efficiently move the scoops subject to other constraints imposed by, e.g., the delivery of glass gobs by the feeder assembly, physical behavior of glass gobs during handling by the gob distributor assembly, etc.

A further problem area is the set up of the gob distributor assembly, and in particular the relative position and orientation of the gob distributor scoops and the chutes associated with the various machine sections. In prior art systems such as that of Pat. No. Re. 28,759, the placement of the scoops was severely constrained by the design of a particular cam, and hence to provide a proper alignment between the scoops in their delivery position of a given section and the chutes of that section it was necessary to adjust the latter. This limited form of adjustment was time-consuming and sometimes resulted in misalignments, which would lead to slaloming of the gobs during delivery, and other problems.

Accordingly, it is a primary object of the invention to provide an electronic drive system for achieving improved control over the motion of the scoops in a gob distributor.

Another object of the invention is to facilitate set up of the gob distributor. In particular, it is desirable to shorten the time acquired to align the gob distributor scoop with the troughs or chutes. It is furthermore desirable to reduce the extent to which the drive system interferes with this alignment process.

Yet another object is to enable the operator to adjust the alignment of the scoops and the troughs "on the fly", to reduce misalignments arising in actual operation.

SUMMARY OF THE INVENTION

In furthering the above and additional objects, the invention provides methods for controlling the operation of glass gob distribution apparatus including at least one scoop which is moveable into alignment with a plurality of receiving troughs, a mechanism for moving the scoop driven by a servomotor, and a motion controller for providing a position signal to the servomotor in accordance with digital position values.

A first such method is used in setting up the gob distributor for subsequent operation, and involves the steps (repeated for each of the troughs), of: moving the scoop into proximity with the trough, and shifting the motion controller, if required, through one or more digital position values to jog the servo-motor and move the scoop into alignment with the trough. Advantageously, the above-described set-up technique also includes the step of repositioning the receiving trough, if necessary, to improve its alignment with the scoop. In the preferred embodiment, the motion controller stores a plurality of preset digital position values approximating the various trough locations, and the setting-up process results in a set of adjusted digital position values representing the values after shifting the motion controller.

The invention also provides a method for automatically repeatedly moving the scoop into alignment with a defined sequence of receiving troughs, which method utilizes a predefined digitalized motion profile curve comprising a timed sequence of scoop displacement points. In order to move the scoop to a given target location, this motion profile curve is scaled to the amplitude and direction of the required net displacement. The controller then provides to the servo-motor a timed sequence of position signals in accordance with digital position values defined by the scaled array of scoop displacement points. These steps are repeated for each successive receiving trough in the gob delivery sequence by using as the target location the digital position value of the alignment position of the subsequent through. In the preferred embodiment, the motion profile curve comprises a cubic-parabolic-cubic curve. Other motion profiles may be utilized, however, as known from the art of mechanical cams—advantageously, "combination" curves such as trapezoidal and modified trapezoidal acceleration characteristics.

An important aspect of such method is the time span of the sequence of scoop displacement points; this must be designed to permit gobs to traverse the scoop during the dwell periods between successive scoop motions. This time span may be constant regardless of the distance over which the scoop is to be moved. It may be lengthened or shortened in response to operator input, or may be automatically modified to reflect changes in certain parameters of the gob distributor.

BRIEF DESCRIPTION OF THE DRAWING

Other features of the invention will be apparent from the drawings and following description.

DETAILED DESCRIPTION

Reference should now be had to FIGS. 1–5, which illustrate a preferred gob distributor assembly 10 in accordance with U.S. Pat. No. 4,599,101. The control system of the present invention is employed to particular advantage to drive the gob distributor apparatus of this commonly assigned patent. A preliminary discussion of the mechanical design of such apparatus will serve as useful background to a description of the control electronics.

Figure 1:
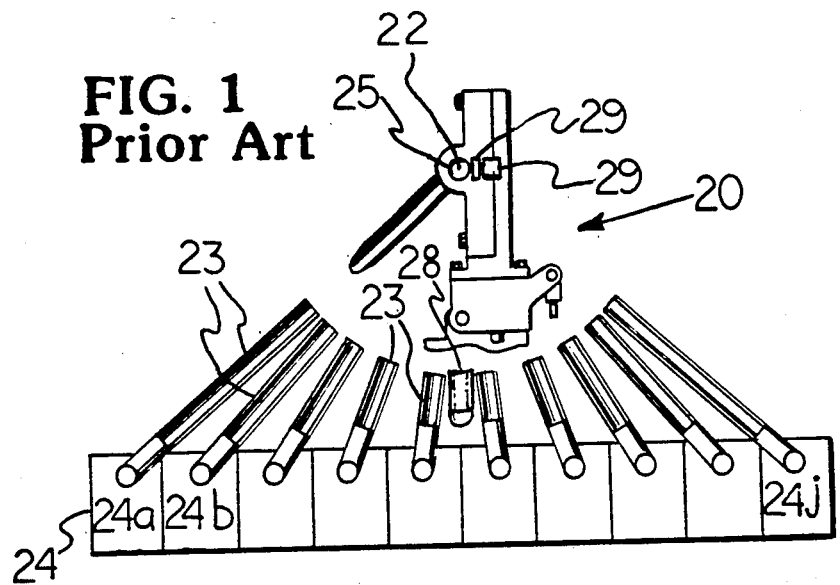
FIG. 1 is a schematic view showing the relation of a pivotally mounted gob scoop to troughs leading to the glassware-forming section, and to a deflector chute.

Reference is first made to FIG. 1 which somewhat schematically illustrates a gob distributor in accordance with U.S. Pat. No. 4,599,101. The gob distributor 20, as will be explained in more detail hereinafter, carries a scoop 21 which is pivotally mounted at 22 for swinging back and forth along an array of troughs 23, with each trough 23 leading into one of the glassware-forming sections 24a, 24b, . . . 24j. The glassware-forming sections 24 are arranged in a side-by-side relationship with the result that the troughs 23 are of different lengths; the spacing between receiving ends of adjacent troughs 23 may be varied. Advantageously, in addition to the various troughs 23 leading to respective sections 24, there is a deflector chute 28, whose lower end opens into the upper end of a cullet chute (not shown). The cullet chute is typically placed above a gob receiving bin located below the floor of the factory. Deflector chute 28 provides a centrally located delivery point for gobs which are to be rejected from the machine rather than delivered to a given machine section ("center dump").

Figure 2:
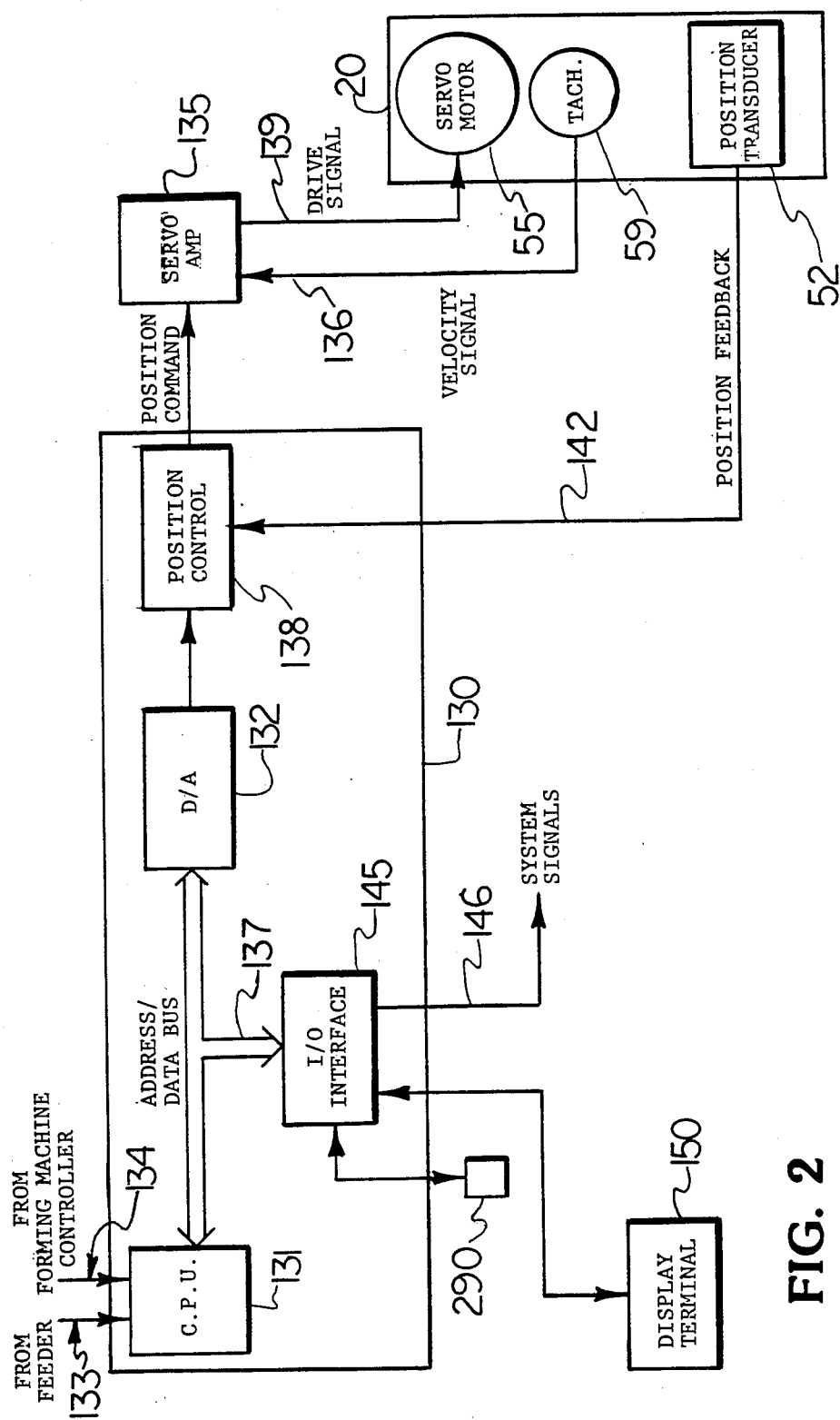
FIG. 2 is a schematic circuit diagram showing a preferred design of the electronic controls for the servomotor of the apparatus in FIG. 1.

It should also be noted that the scoop 21 has a gob receiving end 25 which is coaxial with the pivot 22. In accordance with the teachings of commonly asserted U.S. Pat. No. Re. 28,759, the gob disributor 20 also includes an interceptor mechanism 29 placed between the gob receiving end 25 and the feeder apparatus (not shown). Such interceptor 29 responds to electrical commands to pivot its gate 29a into and out of the path of the falling gobs. Thus gob distributor 20 includes as an important safety feature two different means for preventing the delivery of gobs, i.e. the interceptor 29 and the center dump 28. The interceptor 29 would still be effective, for example, in the event of a failure of the servo-amplifier 135 (FIG. 2).

It is to be understood that the glass gobs may be distributed in groups of one, two, three or more gobs. Each of the glassware-forming sections 24 may be constructed to simultaneously receive one, two, three or more gobs, and therefore each glassware-forming section 24 is provided with a group of troughs equal in number to the number of glass gobs in the gob group. Similarly, a number of deflector chutes 28 would be included matching the number of mold assemblies per section. Finally, while only one gob scoop has been illustrated in FIG. 1, it is to be understood that additional scoops could be used, again depending upon the number of glass gobs to be processed in the individual sections during one cycle.

Figure 3:
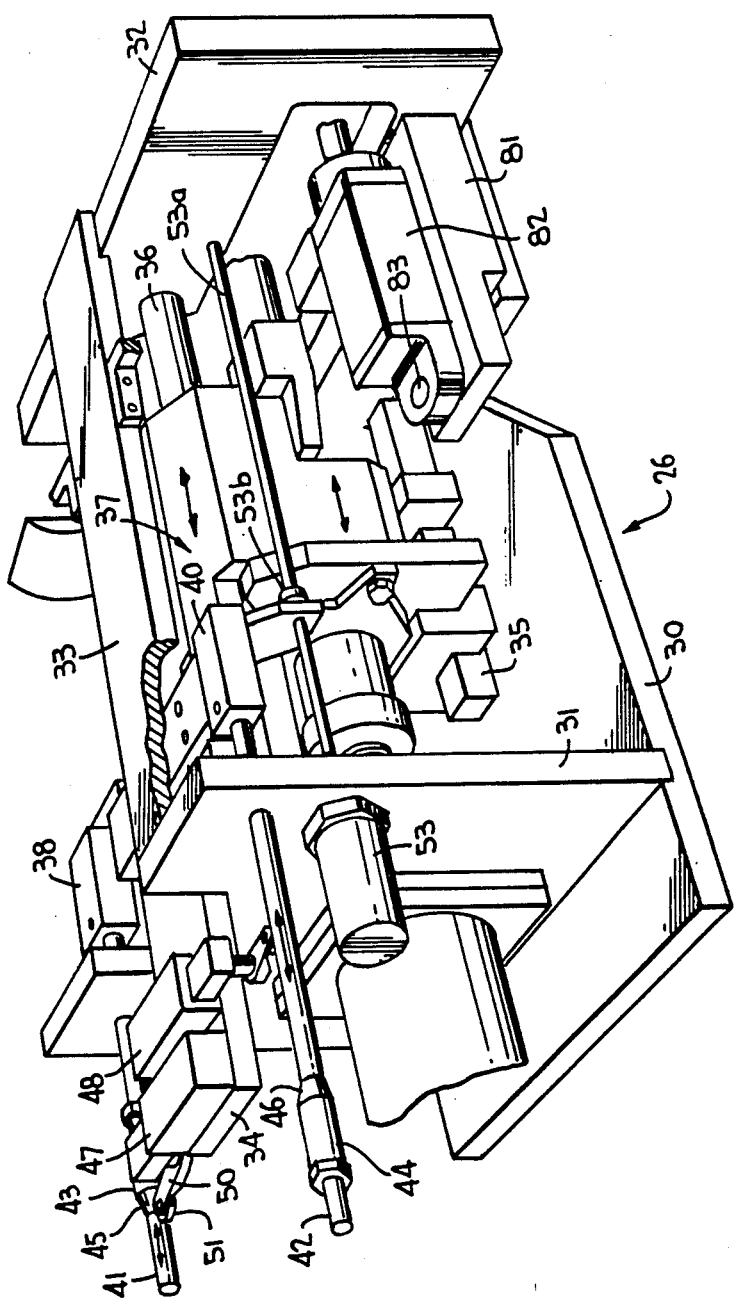
FIG. 3 is a perspective view showing the details of the mounting of a large mechanism which is reciprocated by the servo-motor and to which the rack is releasably coupled.
Figure 4:
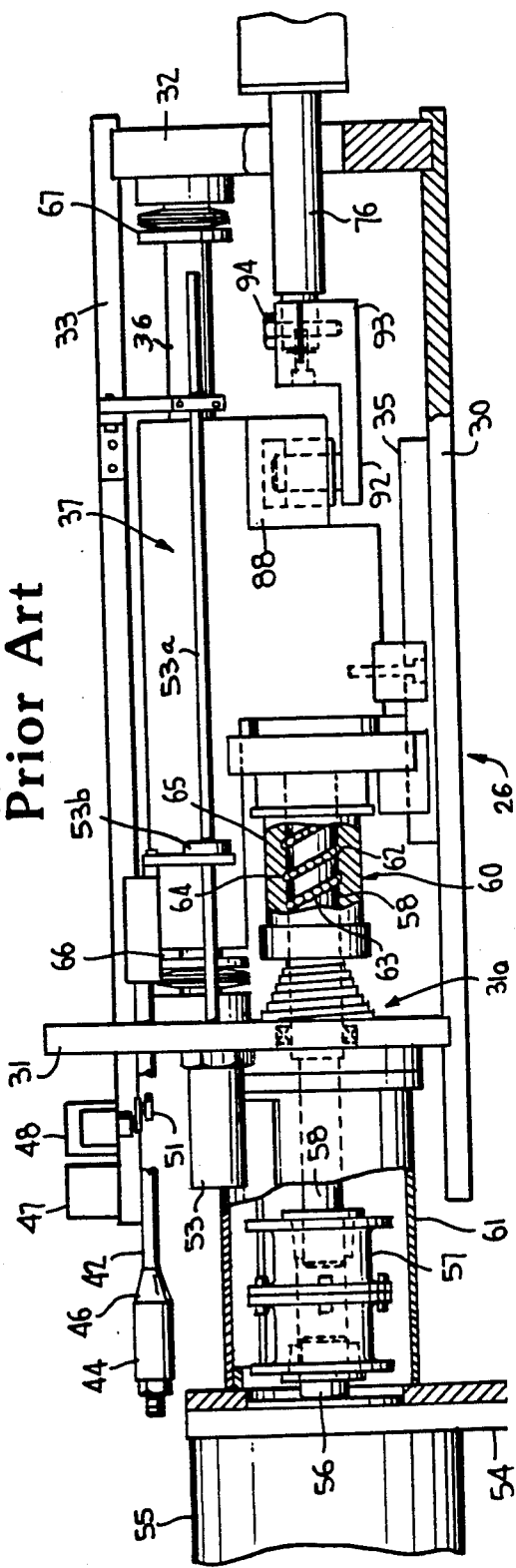
FIG. 4 is a side-elevational view of a left-hand portion of the drive train of the gob distributor of FIG. 3, with parts broken-away and shown in section.
Figure 5:
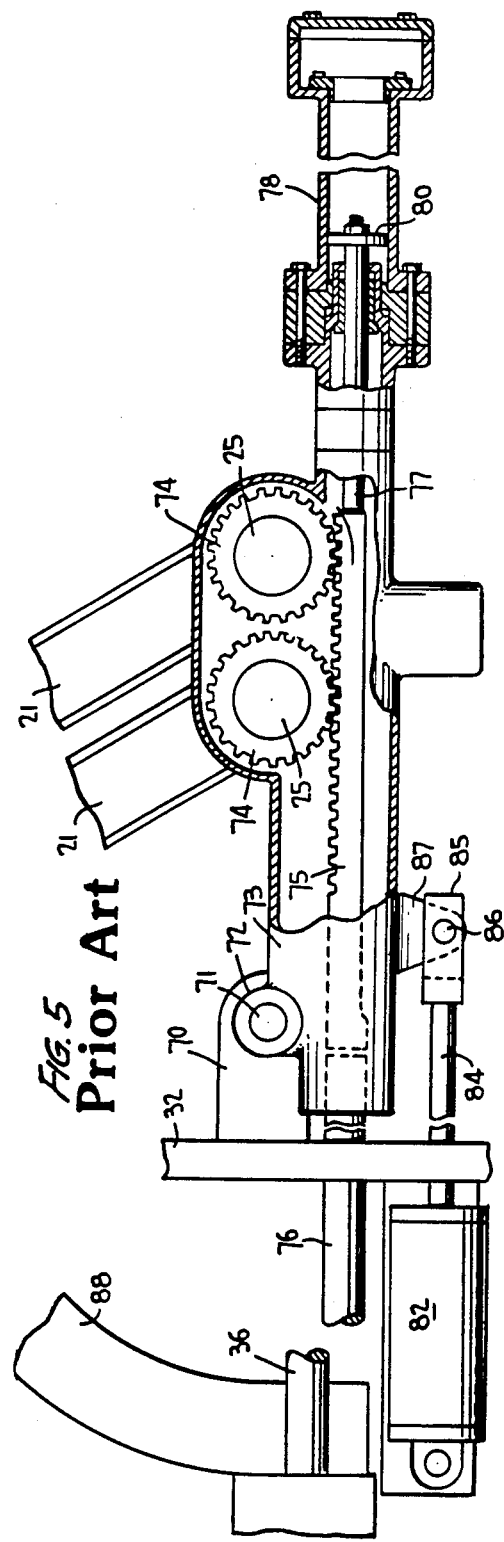
FIG. 5 is a plan view of the right-hand portion of the apparatus with parts broken-away and shown in cross-section, and clearly shows the manner in which a rack positions the scoops and the manner in which the scoop unit is mounted for pivotal movement to an out-of-the-way position where it may be serviced.

Reference is now made to FIGS. 3, 4, and 5 wherein various details of the gob distributor 20 are illustrated. First of all, the fixed support 26 includes a mounting plate 30 which may be secured to the main beam of the array of glassware-forming sections 24. The plate 30 has extending vertically therefrom mounting plates 31 and 32 which are connected together at their tops by a tie-bar 33 which has a portion 34 projecting beyond the plate 31.

The mounting plate 30 has secured to the upper surface thereof a guide key 35 and a guide rod 36 which extends between upper parts of the mounting plates 31, 32 generally below the tie-bar 33. A slide mechanism, generally identified by the numeral 37, is mounted on the guide key 35 and the guide bar 36 for back-and-forth reciprocation.

The slide unit 37 carries a pair of supports 3, 40 which carry rods 41, 42 extending through the mounting plate 31 and carrying limit cam actuators 43, 44. The actuator 43 has a cam surface 45 facing to the left and the actuator 44 having a cam surface 46 facing to the right.

The bar extension 34 is provided with a pair of limit switches 47, 48. Each limit switch 47, 48 includes an actuating arm 50 carrying a cam follower 51. If the slide unit 37 moves too far to the left, the cam 45 will engage the cam follower 51 and actuate the limit switch 47. On the other hand, if the slide assembly moves too far to the right, the cam 46 will engage the cam follower of the limit switch 48 and actuate that switch.

Transducers 52, 53 include sensing tubes 52a and 53a which are stationarily mounted in the mounting plate 31 and extend therefrom. Magnetic sensing heads 52b, 53b are mounted in a bracket extending downwardly from the supports 38 and 40 and surround sensing tubes 52a and 53a. Linear displacement transducers of the type useful herein are commercially available. One, such type is disclosed in U.S. Pat. No. 3,898,555 assigned to Temposonics Incorporated.

Referring now to FIG. 4, it will be seen that the fixed support 26 also includes a mounting plate 54 which carries a servomotor 55, the servomotor being a reversible DC motor. The servomotor 55 has a shaft 56 which is coupled by means of a coupling 57 to an input shaft 58 of a rotary-to-linear drive, generally identified by the numeral 60. The coupling 57 is positioned within a casing 61 which extends between the mounting plates 31 and 54.

The rotary-to-linear drive 60 is in the form of a circulating nut coupling wherein a shaft, such as the extension of the drive shaft 58, will be provided with spiral grooves 62 and in which balls 63 continuously circulate. The balls 63 are received in grooves 64 in a nut 65. The nut 65 is suitably fixedly secured to the slide unit 37. A mounting bearing 31a is mounted in support 31 which is designed to prevent linear motion of shaft 58.

Thus, as the motor 55 rotates, it will advance or retract the nut 65 which, in turn, will advance or retract the slide unit 37. With respect to the slide unit 37, it will be seen that suitable stops 66 and 67 will be adjustably carried by the mounting plates 31, 32 to limit the travel of the slide unit 37.

Referring now to FIG. 5, it will be seen that a bracket 70 extends forwardly from the mounting plate 32 and carries a vertical pivot pin 71 on which a pivot sleeve 72 is channeled for pivoting. The pivot sleeve 72 is carried by an elongated housing 73 which caries the scoops 21. The scoops 21, in turn, are supported in a manner which is not part of this invention, but do include pinions 74 through which the gob receiving openings 25 extend.

A rack 75 is positioned within the housing 73 and meshed with the pinions 74. The left part of the rack 75 is carried by a circular shaft portion 76 which is suitably journaled within the left portion of the housing 73. the right portion of rack 75 is in alignment with a smaller diameter shaft 77 which is journaled in the right end of the housing 73 and is in the form of a piston rod of an air cylinder 78 and carries a piston 80 whereby the shaft is biased against the rack 75.

In order that the housing 73 and the components carried thereby may be pivoted to an out-of-the-way position, as shown in phantom lines in FIG. 1, the support plate 30 carries a mounting block 81, as is shown in FIG. 3, on which an air cylinder 82 is mounted by means of a pivot pin 83. The air cylinder 82 has a piston rod 84 which extends to the right through the mounting plate 32 and carries a fitting 85, including a pivot pin 86 which extends through a bracket 87 carried by the housing 73. When the air cylinder 82 is actuated in the position illustrated in FIG. 5, the piston rod 84 is retracted, causing the housing 73 to pivot in a clockwise direction.

Alternative structural designs for the gob distributor drive assembly are discussed in U.S. Pat. No. 4,599,101.

Reference should now be had to FIG. 2, wherein controls for the servo-motor 55 are illustrated. First, there is a computer unit, generally identified by the numeral 130. The computer unit 130 includes a motion profile computer 131 and a digital-to-analog convertor 132. The central processing unit (CPU) 131 of the motion control computer receives timing pulses from the feeder (not shown) via line 133. It is to be understood that the glass from which glass gobs are formed is extruded as a solid mass and is sheared at intervals. Upon each shearing of the glass runner, a signal is directed to the computer through the lead 133. This coordinates the timing of the motion profile computer with that of the feeder/shears assembly. A timing adjustment may be made to account for the "drop time" of severed gobs from the shears to the top of the scoops.

CPU 131 also receives signals from the forming machine controller (not shown) via line 134 to ensure that the gob delivery sequence follows the firing order of forming machine 24, and to prevent delivery of gobs to those sections not prepared for receiving them.

Operation of the servomotor 55 is directly controlled by a position control servo mechanism drive 138 within computer 130, which outputs position command signals to servo-amplifier 135. A tachometer 59 on the servomotor 55 is connected to the position-control servo mechanism drive 135 through lead 136. The position control 138 receives signals from the digital-to-analog convertor 132, which converts position command signals from the motion profile computer 131 to analog form. An address and data bus 137 links CPU 131 to D/A 132, and is also connected to an input/output interface 145 which supports operator communications via display terminal 150 and hand-held terminal 290.

The servo-amplifier 135 provides drive signals to the servo-motor 55 via line 138 based upon the position command signals from the computer 130, and receives signals from tachometer 59 indicative of the servomotor velocity.

Position tranducer 52 tracks the linear displacement of rack 75 and provides position feedback signals to the Position Control module 138. FIG. 2 omits the second transducer 53, and associated circuitry. As disclosed in U.S. Pat. No. 4,459,101, transducer 53 is a redundant transducer which reduces the impact of transducer output errors. As discussed below, in an alternative embodiment of the invention, an analog to digital converter (not shown in FIG. 2) may be included to digitalize the position feedback signal on line 142 and feed this directly back to CPU 131.

Figure 6:
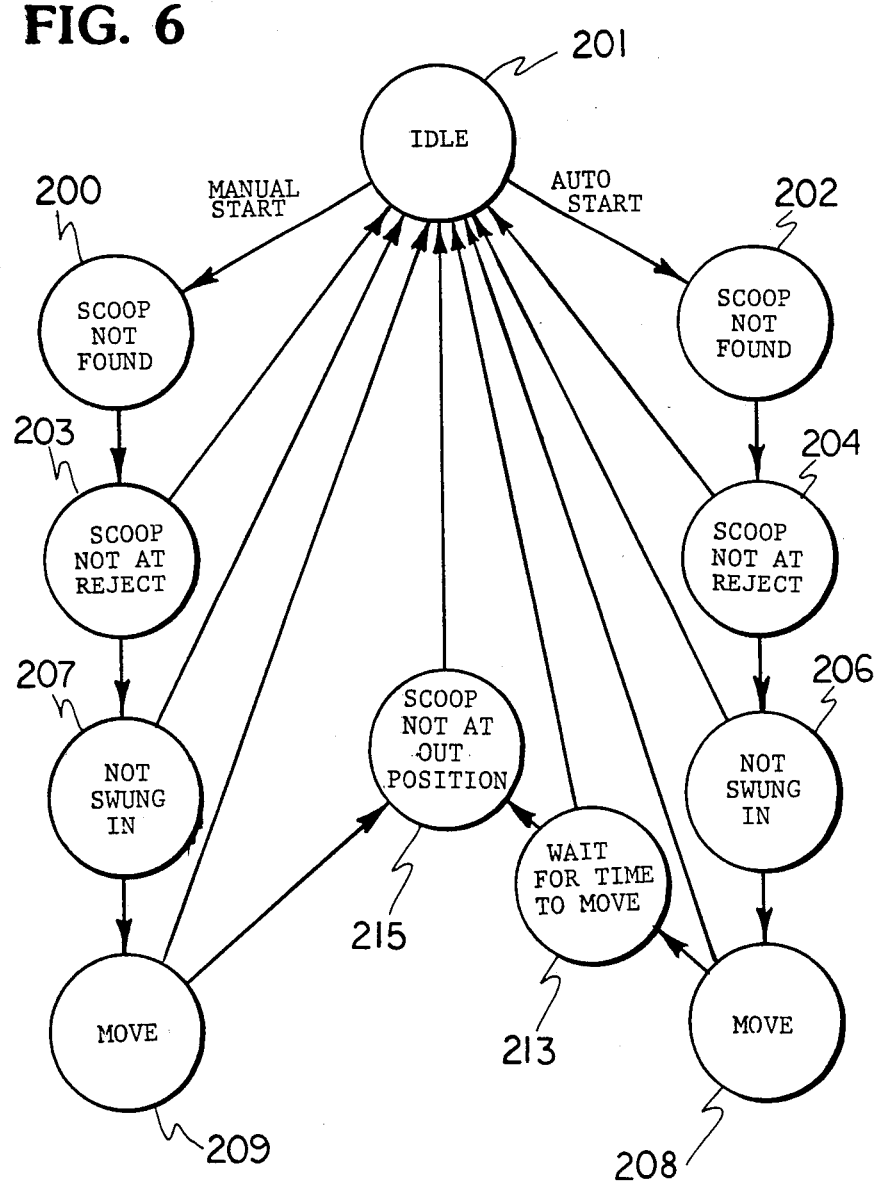
FIG. 6 is a state transition diagram illustrating the principal operational state of the gob distributor apparatus of the invention.
Figure 12:
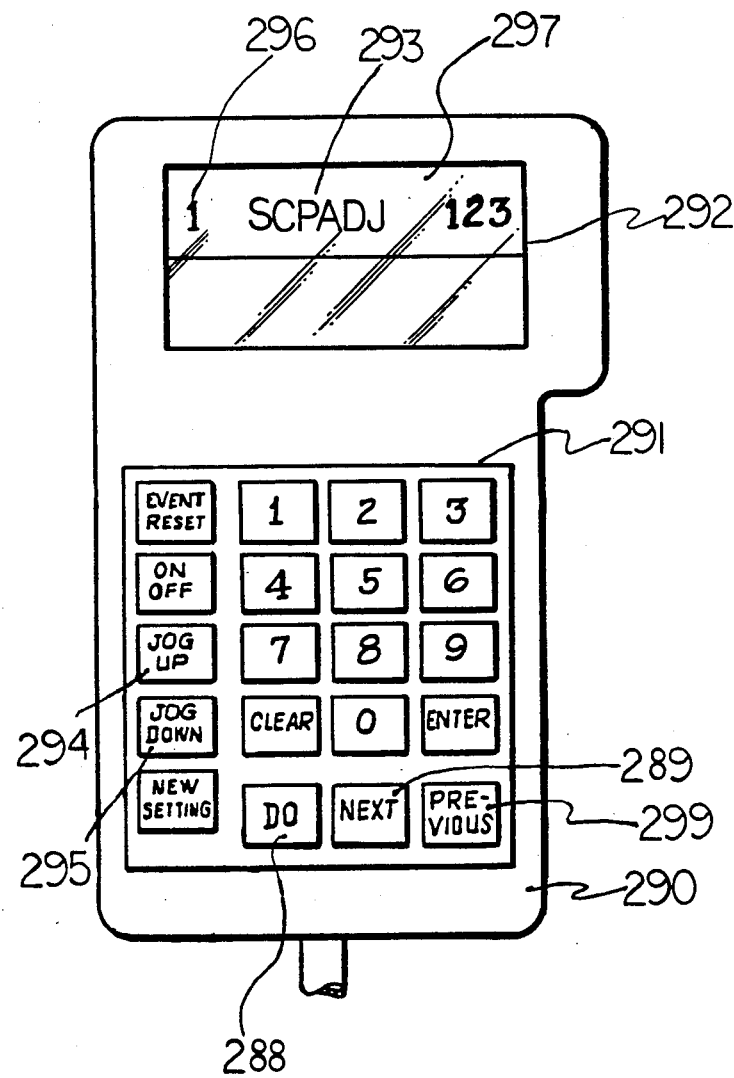
FIG. 12 is a perspective diagram of a preferred design of hand-held terminal for the gob distributor apparatus.

Reference should now be had to FIG. 6, which is a state transition diagram showing the various operational states of the motion profile computer 131. This computer controls two basic operational modes of the gob distributor 20, the manual mode and the automatic mode; the operator selects one of these modes using an appropriate switch or button on the control panel. In the manual mode, which is used for setting up of gob distributor 20, the interceptor 29 (FIG. 1) is positioned to divert gobs to prevent these from reaching the scoop 21. As further explained below, this mode allows the operator to establish suitable position settings for the scoop 21 with respect to each of the troughs 23 (FIG. 12), without requiring mechanical adjustment of scoop 21.

With further reference to FIG. 6, the automatic mode is the normal operational mode of gob distributor 20; the C.P.U. 131 passes through a sequence of states to insure that the gob distributor 20 is ready for delivery. This system enters the idle state 201 after power-up, or in any other of the operational states, if the system encounters an alarm condition or if the operator pushes the stop button. If the operator selects the auto-start mode, CPU 131 enters "scoop not found" state 202, in which the system searches for the position of rack 75 based upon the signal received from the position transducer 52. Further details of this search process are discussed below with reference to the flow chart diagram of FIG. 9. If the scoop is located, the system enters "scoop not at reject" mode, in which it remains until the scoop is moved to the reject position (in the illustrated embodiment, position of deflector chute 28). This is used as the starting position for any subsequent move to a given trough 23. If the scoop is located at the reject position, the system progresses to "not swung in" state 206. This reflects the feature discussed above wherein certain components of gob distributor 20 including the housing 73 and the components carried thereby (FIG. 5) may be pivoted to an out-of-the-way position, i.e., "swung out". CPU 131 remains in "not swung in" state 206 until it is signaled that the gob distributor mechanism has been swung into position.

Figure 10:
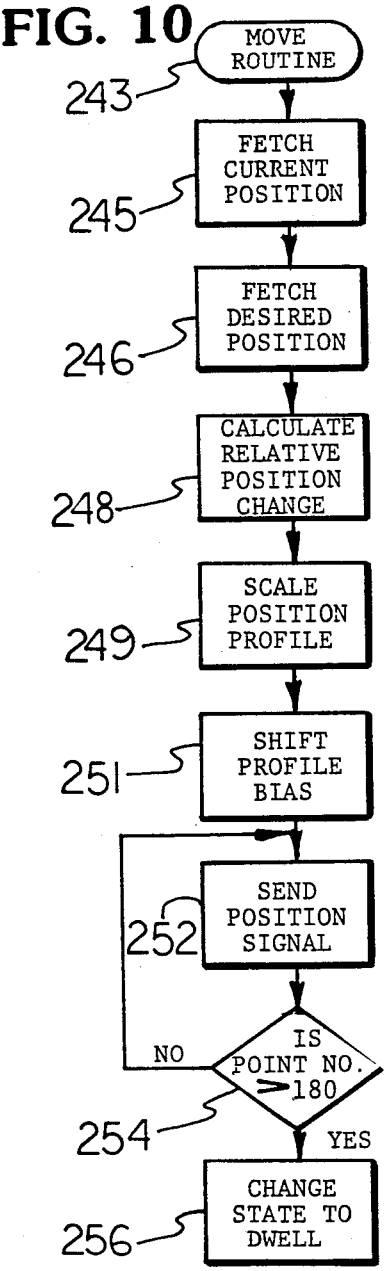
FIG. 10 is a flow chart schematic diagram of a Move routine.

Move state 208 is the principal operating state of the system. In this state, motion profile computer 231 compares signals from the electronic controller for the forming machine (via line 134) with a user-programmed sequence of the gob distributor delivery order. In addition to a confirmation that the firing orders match, the system must verify that the "delivery state" signals are "on" for the particular section, i.e., that the section is ready for delivery. Finally, the "delivery enable" pulse from that section must fall within a prescribed time window with respect to the feeder pulse received over line 133 (FIG. 2). Cf. commonly assigned U.S. Pat. No. 4,453,963 for a disclosure of a gob delivery control system of this type. If delivery is authorized, the motion profile computer follows a Move routine for providing outputs to the digital to analog converter 132 to achieve rapid, accurate movement of the scoops; this routine is discussed below with reference to FIGS. 7 and 10.

If the operator presses the automatic stop button, or in the event of an alarm condition in which power is not lost, the system enters "not at out position" state 215 wherein it waits for an indication that the scoop has been moved to its "out" position. (In the illustrated embodiment, this is identical with the reject or center dump position). This enables the motion profile computer to return to the idle state 201.

The state transitions for the manual mode (i.e, the left-hand branch of the FIG. 6 diagram) for the most part correspond to those of the automatic mode. In the manual mode, however, the system does not test for synchronization with the feeder pulse. The manual Move state differs from the automatic Move state in that the former is designed to cause the scoop to move to a requested position in response to a position request entered by the operator at hand-held terminal 290. The automatic Move state, on the other hand, provides automatic motion control, in which gobs are delivered to requesting sections or to the reject position.

Figure 8:
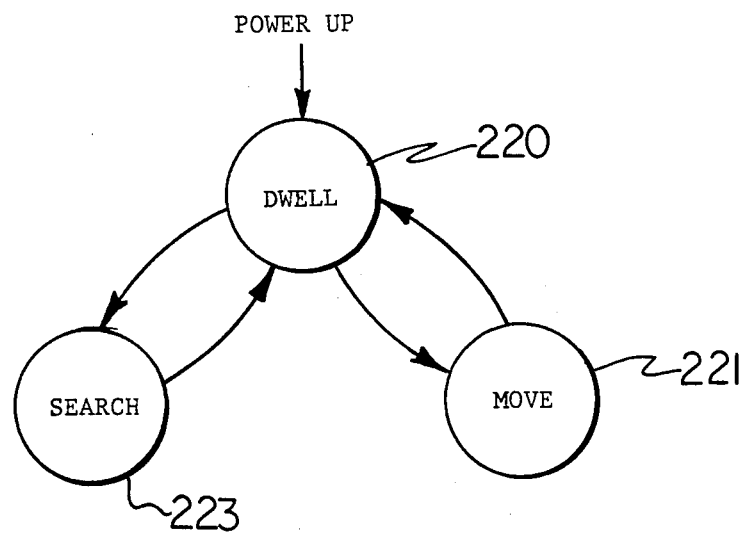
FIG. 8 is a state transition diagram schematically illustrating the Move, Search, and Dwell states of the motion profile computer.
Figure 11:
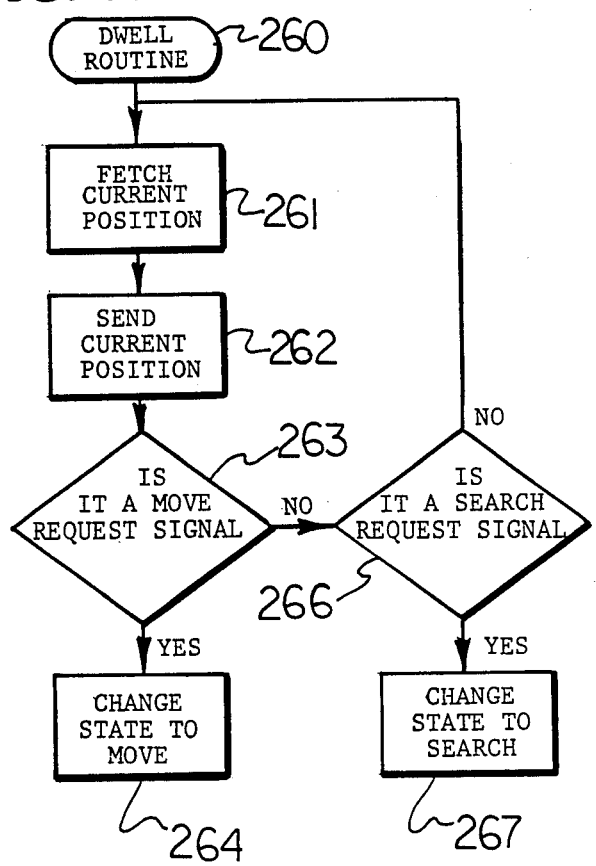
FIG. 11 is a flow chart schematic diagram of a Dwell routine.

FIG. 8 is a state transition diagram for the Move, Search and Dwell functions of the motion profile computer 131. In the Dwell state 220, CPU 131 outputs constant position signals to D/A Converter 132. CPU 131 enters the Move state 225 in response to a command to move to a given section, and reverts to dwell state 220 when the move has been completed. The system enters the Search state 223 in response to a command to find the scoop, and reverts to the Dwell state when the scoop has been found or if the scoop cannot be located. As shown in the flow chart diagram of FIG. 11, in the Dwell state CPU 131 continues to test for Move request and Search request signals at 263 and 266 and causes an appropriate state change should either comparison prove positive. If both comparisons are negative, the system continues to fetch the current scoop position and deliver this to D/A converter 132.

Figure 9:
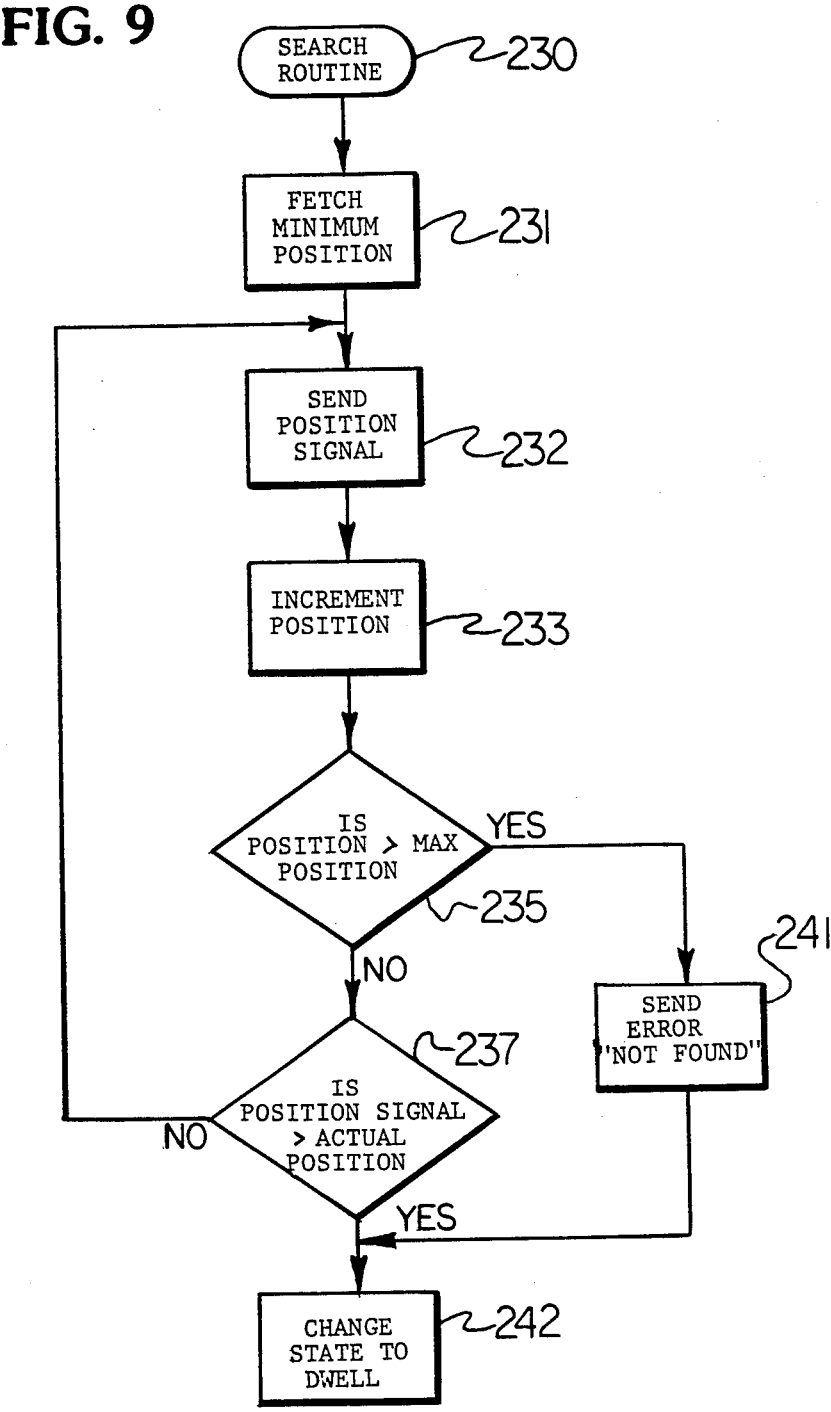
FIG. 9 is flow chart schematic diagram of a Search routine.

FIG. 9 is a flow chart of an advantageous Search routine 230. At 231 the system retrieves from memory the value of the minimum possible position of the scoop, and at 232 sends this position signal to A/D 132. At 233 the processor increments the position command signal. At 235 this position signal is compared with the maximum possible position, stored in memory, and if this comparison is positive a "scoop not found" error message is generated at 241. With a negative result at 235, however, the commanded position value is compared with the actual position signal received by position control 138. The system continues to loop through steps 232, 233, 235, and 237 until the commanded position either exceeds the maximum possible position (i.e., "scoop not found") or until the position latch (i.e., position control 138) becomes activated, signalling coincidence between the commanded position and the actual scoop position. In the latter event, i.e., a positive comparison at 237, the system reverts to the Dwell state at 241 and advances to the "scoop not at reject" state (FIG. 6).

An alternative Search routine utilizes direct feeding back of the position feedback signals from position transducer 52 (FIG. 2), via an analog-to-digital converter. In this routine, the A/D circuit is read to determine whether a scoop position signal is present. If such signal is present, it is analyzed to determine whether the scoop is moving, and if so whether the motion is in the proper direction. If the scoop is not moving, its position is compared with the expected position. A failure of any of these tests results in an error message.

The Move routine relies upon a digitalized representation of an ideal motion curve to control the movement of the gob distributor scoop in a rapid and accurate manner. A variety of "cam" profiles may be employed for the motion profile curve. The acceleration profile should be designed to achieve the maximum speed of operation of gob distributor 20. Inasmuch as the drive source is servo-motor 55, the motor torque characteristics (peak torque, R.M.S. torque) should be consistent with such acceleration profile. While it is desirable to keep within reasonable limits the peak acceleration, it is also advisable to avoid abrupt change in acceleration (i.e. high "pulse" or "jerk"), which will lead to backlash problems. Such cam profiles as cycloidal, 3-4-5 and 4-5-6-7 polynomial, cycloidal, trapezoidal, and modified trapezoidal are illustrative.

Figure 7:
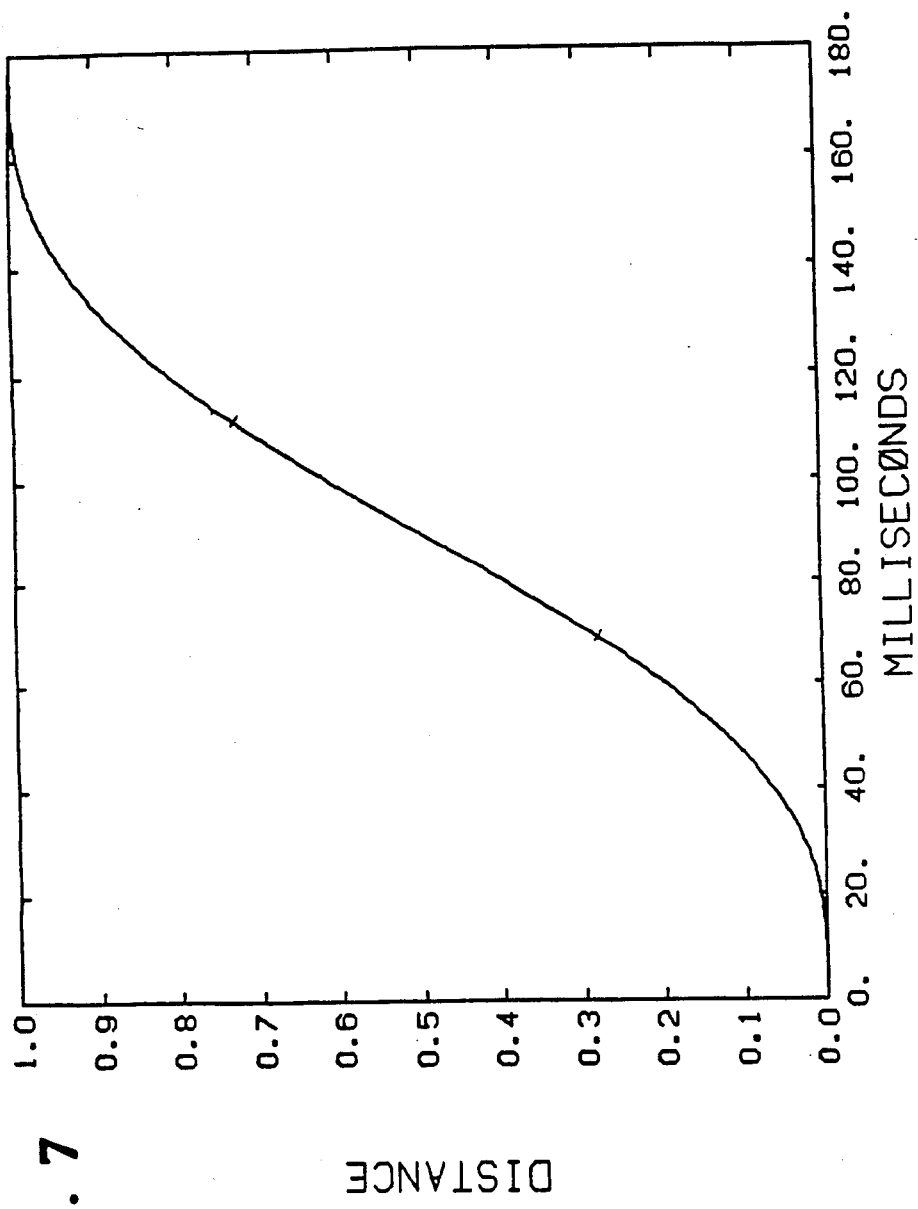
FIG. 7 is a motion profile curve, plotting distance traveled by the rack driving the gob distributor scoop as a function of time.

In the preferred embodiment, the motion profile curve is a "cubic-parabolic-cubic" or CPC curve (a trapezoidal acceleration curve), as shown in the displacement-vs.-time plot of FIG. 7. (In the preferred drive system of U.S. Pat. No. 4,599,104, this curve represents the displacement of slide unit 37). Corresponding time profiles of velocity and acceleration are plotted in FIGS. 13 and 14, respectively. The "trapezoidal" acceleration characteristic includes symmetrical acceleration and deceleration portions, each including successive cubic, parabolic, and cubic sections (e.g. 281, 282, 283). The parabolic sections provide limited peak acceleration, while the cubic sections provide limited peak pulse. In this particular prorfile, equal time intervals are alotted to each section.

The above characteristics enable the gob distributor to attain higher velocities and dramatically increase the maximum distance over which the scoop can be moved as compared with the prior art, and furthermore reduce the time required to move the scoop. This allows the gob distributor to follow a "sequential firing order"; e.g., with reference to FIG. 12, delivery to Section 24a, followed by 24b, etc. wherein at the end of each delivery cycle the gob distributor jumps from one end of the machine (24f) to the other. Such firing order, when usable, facilitates the operator's efforts in mold swabbing and other operations, provides improved deadplate differentials, and other advantages.

This motion control technique relies upon the unit profile to permit the scoop to be moved between any two arbitrary locations within a range defined by the user. With reference to the Move routine of 243 of FIG. 10, at 245, 246, and 248 the system subtracts the current position of the scoop from a desired position, resulting in a vector representing relative distance and direction of travel. This vector is used as a multiplier for the unit profile (FIG. 7), scaling such profile to the desired amplitude and direction necessary for moving the scoop to a desired position (step 249). The scaled profile is then added to the current position, thereby shifting the reference or bias point of the scaled profile (step 251). The loop consisting of steps 252 and 254 is timed by a one millisecond interrupt. Illustratively, the digitalized motion profile curve (FIG. 7) consists of one hundred and eighty digital position values. At 252 the motion profile computer 131 delivers to the D/A converter 132 one of the 180 scaled, bias shifted digital position values previously generated. This process has continued until point number 180 is reached, i.e., the motion profile computer has followed the entire CPC curve.

Figure 15:
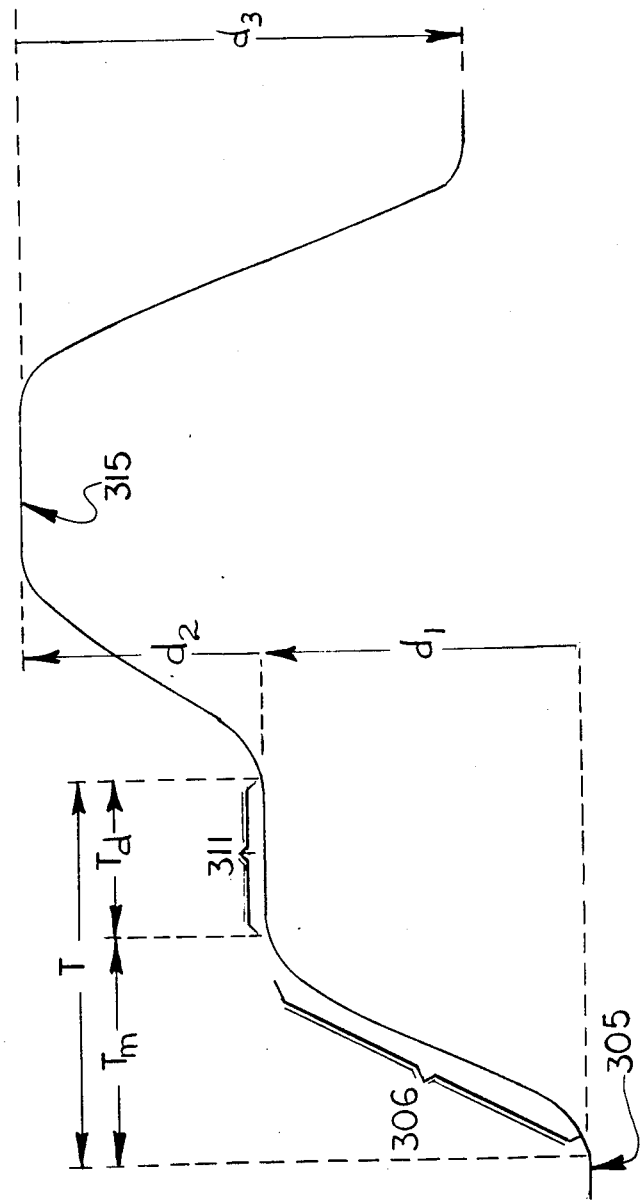
FIG. 15 is a plot of rack displacement as a function of time, for a sequence of three scoop movements.

Reference should be had to the plot of FIG. 15, showing rack displacement (vertical axis) as a function of time (horizontal axis). The motion profile for a series of scoop movements comprises a series of scaled move profiles based upon the standard curve of FIG. 7, with intervening dwell periods. Thus, with a starting location corresponding to the digital position value at plateau 305, and a desired target location corresponding to plateau 310, the standard displacement profile is scaled to distance $D_1$. This distance is traversed during the move period $T_m$, at 306, followed by a dwell period $T_d$, so that the move cycle constitutes $T=T_m+T_d$. This move cycle may be repeated for successive target locations 315, 320, etc. in accordance with the prescribed gob delivery "firing order", each time using the prior target location as the starting value, and appropriately scaling the displacement profile.

Applicants have found that the use of a standardized time interval for scoop motion regardless of distance to be traveled accommodates the objectives of improving the speed of the gob distributor, and of allowing sufficient time for the gob to travel from the top of the scoop 21 to a trough 23 or to the deflector chute 28. Important parameters of the system in this regard include the speed of the feeder assembly; the height between the top of the scoop and the shears, which affects the velocity of the gobs falling down the scoop; and the number of forming machine sections 24 (which determines the number of cuts per minute). With reference to FIG. 15, the feeder cycle time (time between cuts) T equals the scoop motion time $T_m$ plus the dwell time $T_d$ between scoop motions. It is necessary to allow sufficient dwell time to permit the gob to travel down the length of the scoop and into the trough before the scoop returns to the reject position.

To illustrate the relationship of these parameters, the 180 millisecond scoop motion period is about the fastest motion time consistent with a ten section machine operating at a 200 cuts per minute feeder cycle. This corresponds to 300 milliseconds between cuts and therefore a 180 millisecond motion period results in a minimum dwell time of 120 milliseconds. 120 milliseconds has been found to be sufficient to ensure delivery of the gobs given a shears-to-scoop height of at least six inches.

Although the illustrated motion profile involves a standard period, it is possible to permit the operator to "stretch" or reduce the time span of the curve to reflect different machine requirements (gear ratios, larger forming machines requiring longer maximum travels, etc.). This could be done by changing the number of digital position values comprising the motion profile, or by raising or lowering the time interval between successive points (defined by an interrupt signal within CPU 131). Another approach would be to adjust the required dwell time as a percentage of the top feeder speed: One can reduce the maximum cuts per minute of the feeder assembly thereby increasing the minimum cycle time, and accordingly increasing the dwell time. The crucial consideration is to ensure that the gob distributor cycle provides at least the minimum dwell time required to ensure that the gobs will travel the length of the scoops.

In order that the gob distributor 20 will properly load glass into the troughs 23 of the forming machine, in operation the scoop must be aligned with each of the troughs to form a straight line. Prior art mechanical gob distributors defined fixed positions for the scoop in the drive cam, so that during set-up only the troughs could be adjusted for alignment purposes. In such prior systems, although it is possible to adjust the troughs so that they meet the scoop, it is impossible to get true alignment. The present invention permits electronic adjustment of the scoop position during the set-up phase, i.e., in the manual mode. With further reference to the state transition diagram of FIG. 6, for the purposes of aligning the scoops with the various troughs in later operations, the operator sequences through the stages 201, 203, 205, 207, to the manual move stage 209, in which he electronically adjusts the alignment of the scoop 21 with each of the section troughs 23 and with deflector chute 28. Proper alignment may be verified visually, and advantageously also using a suitable mechanical aid such as a bar configured to fit between scoop and trough when these are properly aligned.

Figure 13:
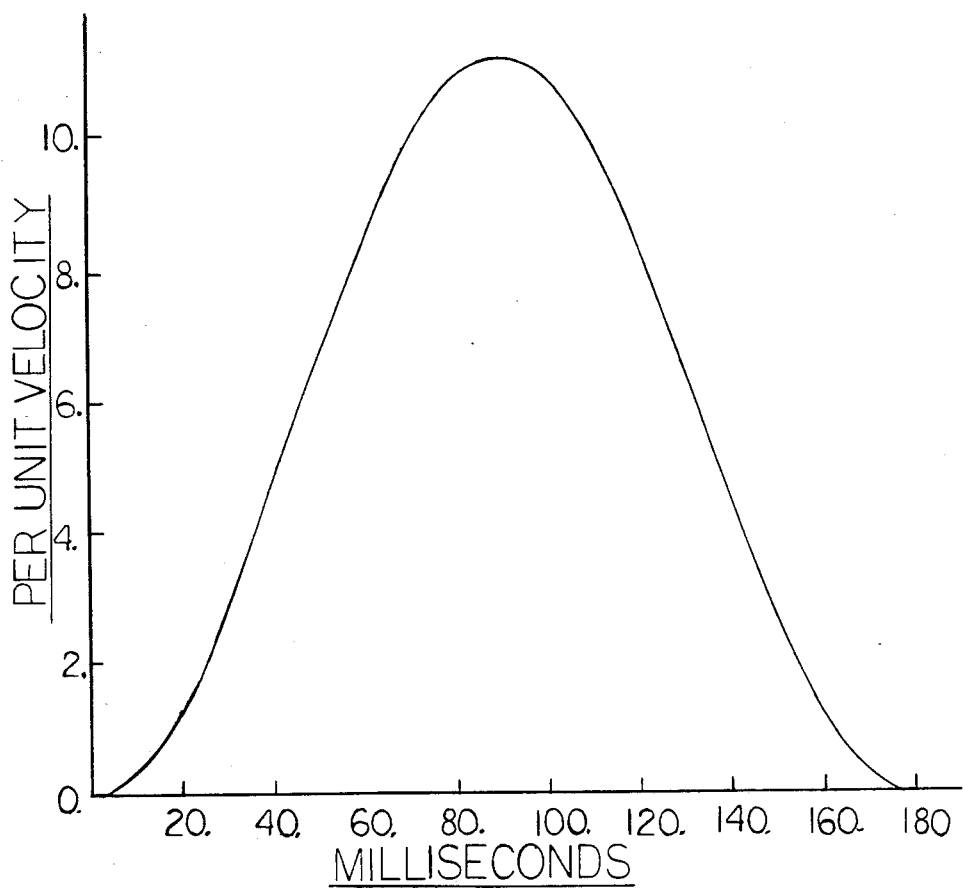
FIG. 13 is a plot of per unit velocity as a function of time, corresponding to the displacement profile of FIG. 7.
Figure 14:
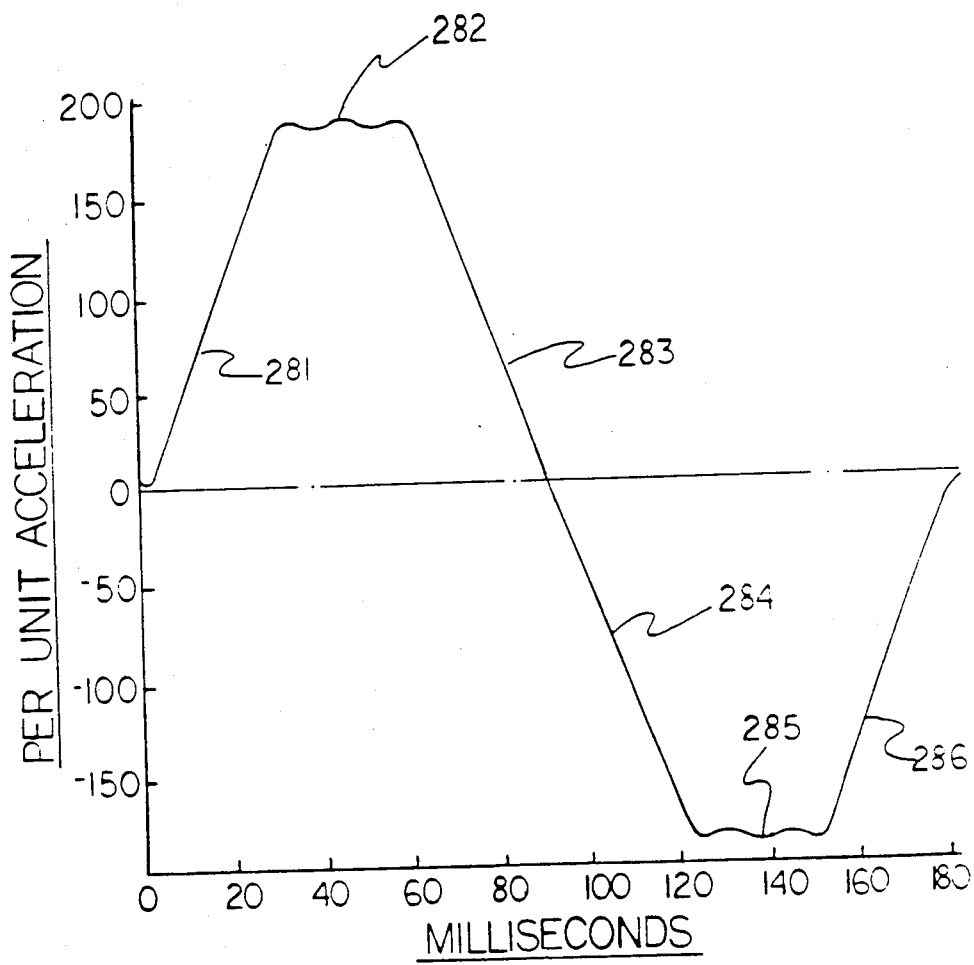
FIG. 14 is a plot of per unit acceleration as a function of time, corresponding to the displacement profile of FIG. 7.

In the manual Move state, the operator uses a handheld terminal of the type illustrated at 290 in FIG. 13 in order to provide appropriate commands to the control electronics; this may be the same hand-held terminal used to control the forming machine, as disclosed in commonly assigned U.S. Pat. No. 4,461,269. Hand-held terminal 290 is used to select the trough with respect to which the scoop position is to be adjusted; when a given section number is selected the scoop will move to a pre-set position proximate the respective trough 21, permitting the operator to adjust the scoop position setting for that section. Using the handheld terminal 290, the operator selects the "scoop adjust" function displayed at 293. By pressing the "do" key 291 the section number display 296 will be changed to read "0". While looking at the scoops the operator then presses the JOG UP and JOG DOWN keys 292, 296 to cause the scoops to be aligned with the deflector chute 298 (center dump position). JOG UP moves the scoop toward the higher section numbers, while JOG DOWN moves the scoop toward the lower section numbers; the digital position value is displayed at 297. After centering for section zero the operator presses the next key 293 to advance to the next section number; the previous key is used to revert to the previous section. During this alignment process, the operator may also adjust the trough position, as known from the prior art. After completing this initial alignment the operator presses the manual stop to cause gob distributor 20 to swing out. Thereafter, the settings arrived at in this set-up process may be used to control the scoop movement in the automatic mode.

In addition to scoop alignment in the set-up phase, described above, the invention permits realignment while the gob distributor is operating (automatic mode). Again, this relies upon using the SCOOP ADJUST function of the hand-held terminal 290 in order to adjust the digital position value for a particular section, relying upon the operator's visual inspection. This allows continuing re-alignment of the scoops in response to trough vibration and other causes of misalignment.

We claim:

1. A method for controlling the motion of a glass gob distribution device, such device including at least one scoop which is moveable into alignment with a plurality of receiving troughs, a mechanism for moving the scoop driven by a servo-motor, a motion controller for providing a position signal for the servo-motor in accordance with a digital position value, said motion controller including memory means for storing digital position values representing scoop locations proximate each of the troughs, comprising the steps of
    shifting the motion controller, if required, through one or more digital position value while observing the scoop to jog the servo-motor and move the scoop into alignment with a selected receiving trough, and
    causing the memory means to replace a previously stored digital position value representing the alignment position for said selected receiving through with the digital position value at the completion of shifting the motion controller.

2. A method as defined in claim 1, further comprising the step of measuring the alignment of said scoop and said trough with a member which is configured to fit between said scoop and trough when these are properly aligned, wherein the measuring step is effected in conjunction with the shifting step.

3. A method as defined in claim 1, wherein said shifting step is effected prior to distributing glass gobs.

4. A method as defined in claim 1, wherein said shifting step is effected during the distribution of glass gobs.

5. A method as defined in claim 1, wherein the shifting and causing steps are repeated for each of the sections or delivery stations of a forming machine to which glass gobs are to be delivered.

6. A method for controlling the motion of glass gob distribution apparatus, such apparatus being of the type including at least one scoop which is moveable into alignment with a plurality of receiving throughs, a mechanism for moving the scoop driven by a servo motor, and a motion controller for providing a position signal for the servo motor in accordance with digital position values, said motion controller containing a digitalized motion profile curve comprising a sequence of scoop displacement points and timing means for periodically, sequentially reading the sequence of scoop displacement points to produce the digital position values; said method comprising the steps, repeated for each of a sequence of receiving troughs, of
    scaling said sequence of scoop displacement points to the amplitude and direction of a desired net displacement of the scoop;
    shifting the values of the scaled sequence of scoop displacement points by the digital position value of the initial scoop location; and
    providing a periodic series of position signals to the servo-motor in accordance with digital position values defined by the scaled, shifted array of scoop displacement points.

7. A method as defined in claim 6 wherein the motion profile curve comprises a cubic-parabolic-cubic curve.

8. A method as defined in claim 6, wherein the receiving troughs include a plurality of guide troughs for a glassware forming machine, and a reject trough.

9. A method as defined in claim 6 wherein the time span of the sequence of scoop displacement points is standardized for different scoop motions.

10. A method as defined in claim 9 wherein the operator may shorten or lengthen the standardized time span.

11. A method as defined in claim 6 wherein the time span of the array of scoop displacement points is automatically adjustable in response to changes in pertinent parameters of the gob distributor.

12. A method as defined in claim 6 further comprising the step of causing a predetermined time delay between the end of a given scoop motion and the beginning of the next scoop motion.

13. Apparatus for controlling the motion of glass god distribution system, such system including at least one scoop which is moveable into alignment with a plurality of receiving troughs, a mechanism for moving the scoop driven by a servo motor, and a motion controller for providing position signals for the servo motor in accordance with stored digital position values, said motion controller including,
    a motion profile memory means for storing an array of scoop displacement points;
    means for scaling said array to the amplitude and direction of a desired net displacement of the scoop mechanism;

means for shifting said array by a digital position value representing the starting positions of the scoop and scoop mechanism;

timing means for defining a period of providing the position signals to said servo-motor; and means for providing a periodic series of position signals to the servo-motor in accordance with digital position values defined by the scaled, shifted array of scoop displacement points at a rate defined by said timing means.

14. Apparatus as defined in claim 13, wherein the timed series of scoop displacement points provides a series of position signals with a limited peak acceleration and peak pulse.

15. Apparatus as defined in claim 13, wherein the timed series of scoop displacement points comprises a cubic-parabolic-cubic curve.

16. Apparatus as defined in claim 13, further comprising means for adjusting the time span of the timed series of scoop displacement points.

17. Apparatus as defined in claim 16, wherein the adjusting means operates automatically in response to changes in predetermined parameters of the glass gob distribution system.

18. Apparatus as defined in claim 13 wherein the motion controller operates to move the scoop into alignment with a sequence of receiving troughs, further comprising means for causing a predetermined time delay between the end of a given series of position signals to the servo-motor and the beginning of a succeeding series of position signals to the servo-motor.

* * * * *